Figure 1:
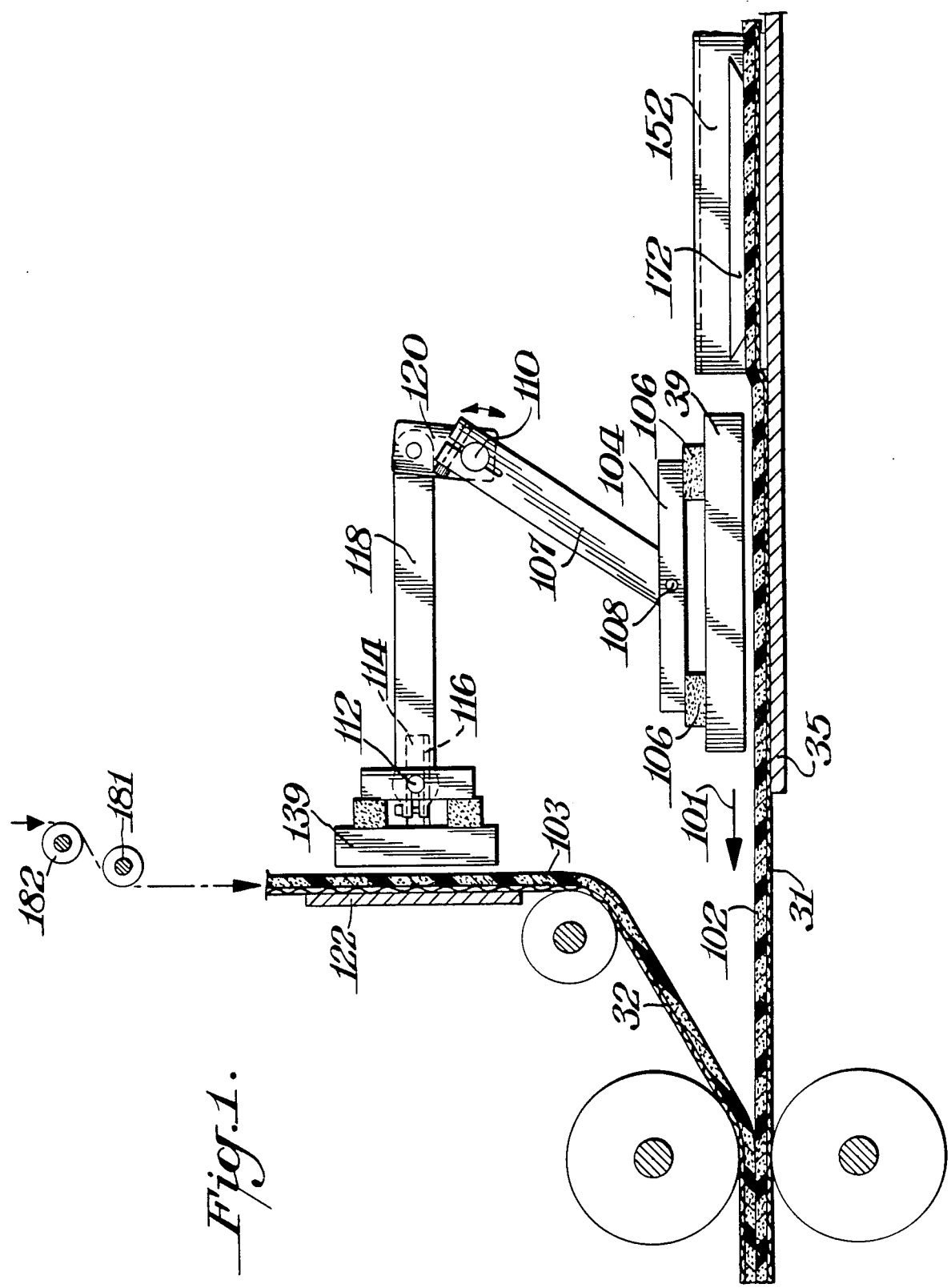

United States Patent [19]

Raszewski

[11] Patent Number: 4,693,056

[45] Date of Patent: Sep. 15, 1987

[54] HEAT SEALING AND PACKAGING

[75] Inventor: Lewis R. Raszewski, Stevensville, Md.

[73] Assignee: The Crowell Corporation, Newport, Del.

[21] Appl. No.: 783,430

[22] Filed: Oct. 4, 1985

[51] Int. Cl.⁴ .................. B65B 9/02; B65B 23/00
[52] U.S. Cl. ................................ 53/450; 53/463; 53/472; 156/320
[58] Field of Search ............. 53/472, 450, 463, 477, 53/553, 141, 373, 555; 156/78, 320

[56] References Cited

U.S. PATENT DOCUMENTS

| | | | |
|---|---|---|---|
| 2,167,634 | 8/1939 | Calvert | 53/463 X |
| 2,340,260 | 1/1944 | Clunan | 53/450 |
| 3,229,442 | 1/1966 | Gram | 53/450 |
| 3,411,263 | 11/1968 | Smolderen | 53/450 X |
| 3,735,551 | 5/1973 | Pratt | 53/450 X |
| 4,036,675 | 7/1977 | Amberg et al. | 156/320 X |
| 4,074,505 | 2/1978 | Keren et al. | 53/450 |
| 4,302,272 | 11/1981 | Phillips et al. | 156/320 X |
| 4,379,008 | 4/1983 | Gross et al. | 156/320 X |
| 4,396,447 | 8/1983 | Firth | 53/553 X |

FOREIGN PATENT DOCUMENTS

WO85/04150  9/1985  PCT Int'l Appl. .................. 53/472

Primary Examiner—Horace M. Culver
Attorney, Agent, or Firm—Connolly & Hutz

[57] ABSTRACT

Sealing of elongated packaging laminates of backed antistatic foam around spaced articles being packaged, using edge seals made by first applying heated melting shoes against foam edges of both laminates, then joining the melted foam edges and subjecting the assembly to rollers that press together the joined laminates. Preferably the backing has aluminum layer secured to the foam by pressure-sensitive adhesive. Edge seals can be further subjected to pressure sustained for at least about a second, as while similar pressure is used to apply transverse heat seals to the edge-jointed laminates.

8 Claims, 2 Drawing Figures

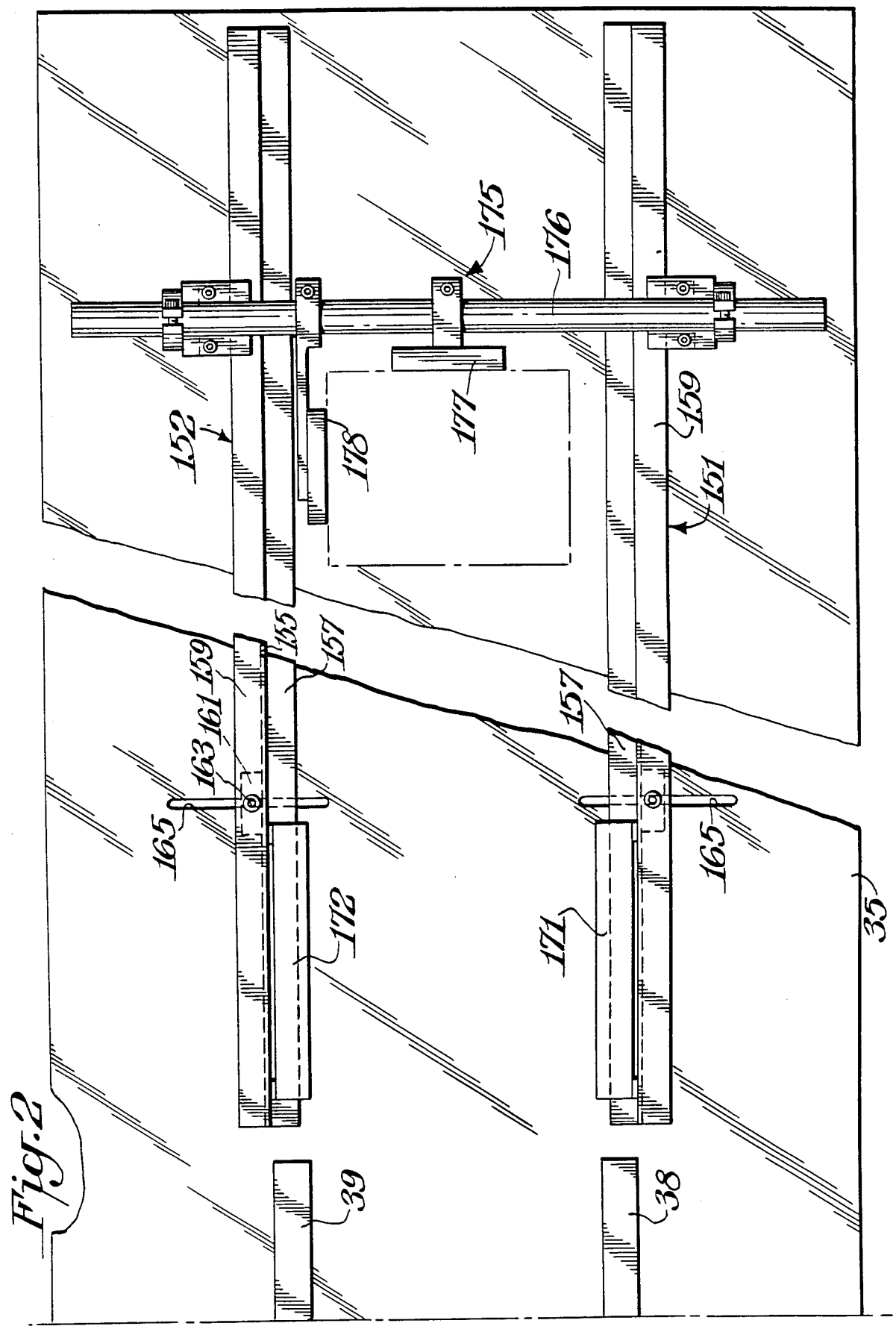

HEAT SEALING AND PACKAGING

The present invention relates to heat sealing, more particularly to the heat sealing of articles between packaging strips.

Prior heat sealings of this type are shown in U.S. patent applications Ser. Nos. 645,887 filed Aug. 31, 1984 and 665,383 filed Oct. 26, 1984, as well as in the references of record in those applications. PCT application US85/00399 published Sept. 26, 1985 also shows such heat sealings.

Among the objects of the present invention is the provision of novel heat-sealing techniques and apparatus that are highly effective.

The foregoing as well as additional advantages of the present invention will be more fully appreciated from the following descriptions of several of its exemplifications, reference being made to the accompanying drawings in which:

FIG. 1 is a schematic side view of a heat sealing operation in an apparatus of the present invention; and FIG. 2 is a detailed view of other aspects of the apparatus of FIG. 1.

According to the present invention, relatively small articles are packaged between two elongated wrapping laminates each having a layer of antistat foam laminated to a backing web and the foam layer of one laminate is heat sealed to the foam layer of the other laminate while the elongated laminates are advanced by side edge rollers through a heat sealing zone as articles to be heat sealed are sandwiched between them. A feature of the present invention is that the laminates are prepared for the heat sealing by melting the foam at the side edges of both laminates at their heat sealing sites, and the laminates with the melted foam edges are pressed together to heat seal them together after an articles is sandwiched between them.

A series of articles can thus be sealed in spaced-apart positions with the pre-melting applied to the side edges of the laminates just before they are sandwiched together, and side-edge sealing is effected by a roller treatment applied to those side edges after they are sandwiched together.

The sandwiched assembly can be given transverse heat sealings, as by advancing the laminates in step-wise fashion and applying the transverse heat sealings during pauses between advancing steps.

The presence of an antistat coating on the resin foam, particularly on a foam such as a polyolefin foam that would otherwise be hydrophobic, affects the heat sealing behavior of the foam. The melting of one of the foam layers to be heat sealed helps the heat sealing, but better results are obtained when both foam layers are melted, particularly when the foam layers are adhered to backing sheets by a pressure-sensitive adhesive.

Turning now to the drawing figures, they show modifications according to the present invention, of the heat sealing of Ser. No. 665,383 and of PCT/US85/00399. Reference is hereby made to that PCT application for a complete description of that heat sealing.

FIGS. 1 and 2 of the present application show the upstream portion of the feed of paper-foam packaging laminates 31 and 32, modified to effect the melting of the side edges of the foam layer of each laminate.

In FIG. 1 the lower wrapping laminate 31 is, as in Ser. No. 645,887, advanced along the top of a fixed table 35 in the direction of arrow 101, with its foam face 102 up. A pair of melting shoes, one of which is shown at 39, is arranged to be brought down into contact with that foam face 102 at the side edges of the laminate 31, to melt the foam in those locations. The melting shoes are preferably electrically heated through flexible electric leads that are not shown, and held by bars, one of which is shown at 104. Thermal insulators such as ceramic discs 106 can be inserted between the shoes and the bars to reduce heat transfer from the shoe to the shoe lifting and lowering mechanism.

Each bar 104 is suspended from an arm 107 to which the bar is pivotally secured by means of pivot pin 108. Each arm is in turn clamped to the same actuating shaft 110 that extends transversely across the width of the table. That shaft is rotated as by an air cylinder which is not shown, to lower or raise the melting shoes.

A second set of melting shoes, one of which is shown at 139, is similarly arranged for engagement with the foam face 103 of the upper wrapping laminate 32 at its side edges. The second set of shoes is mounted similarly to the first set, and carried by a guide rod 112 to which these shoes are rigidly fixed. The guide rod 112 extends transversely across the table and is in turn guided by side rails, one of which is shown at 114 as fixed in place with a lower flange 116 on which guide rod 112 slides.

The sliding of the rod carrying the second melting shoe assemblies, is effected by a pair of links, one of which is shown at 118, and both also fixed to the guide rod. The links are in turn operated by crank arms, one of which is shown at 120, and both clamped to actuating shaft 110.

In FIG. 1 the actuating shaft is illustrated as rotated to its most clockwise position, where it has lifted all the melting shoes away from the respective foam layers. Counter-clockwise rotation of the actuating shaft from this position, moves all the melting shoes into melting engagement with the respective foam layers.

A backing plate 122 is fixed to the guides for the top wrapping laminate, to help hold that laminate against the melting shoes when the shoes are in melting position.

It has been discovered that the heat sealing of the foregoing prior art using the foam pre-melting can be significantly improved when the foam is an antistatic foam, by pre-melting both layers of foam to be heat sealed together. Such improvement provides a seal more difficult to tear open, particularly where the foam is a hydrocarbon foam. regardless of the type of antistatic treatment used. Typical antistatic treatments are described in U.S. Pat. No. 4,321,297.

The greatest improvement in sealing strength is contributed when the foam to be melted is adhered to its backing layer with a pressure-sensitive laminant as described in application Ser. No. 768,103 filed Aug. 21, 1985, the contents of which are hereby incorporated herein as though fully set forth. Such improvement is particularly desirable when the foam layer is bonded directly to a layer of aluminum, either as foil or as an aluminized coating on paper or plastic.

The melting shoes do a good job of melting a polypropylene foam moving at a rate as high as about 10 centimeters per second, when they are heated to about 400° F. to 450° F. It is not necessary for the lower melting shoes to have the same length in the machine direction (that of arrow 101), as the upper melting shoes, but shorter shoes should be held at somewhat higher temperatures than longer shoes. An aluminum, plain steel or stainless steel foam-engaging surface on the melting shoes, does a good job and the melted foam does not build up on the shoes to any significant extent.

As in the above-cited prior art heat sealings, the heat sealings of the present invention can be effected with the wrapping laminates advancing stepwise or in a continuous uninterrupted motion. By arranging for transverse heat sealing with a pressing dwell of more than two seconds while the foam is hardening, very strong transverse seals are formed notwithstanding the presence of antistatic coatings on the surfaces of the foams being heat sealed. A pressure of only about one pound per square inch is sufficient for this purpose, and a pressing dwell of about 2½ seconds is preferred.

The heat sealings of the pre-melted foams at the side edges of the laminates is also improved by subjecting them to extended pressing, over their entire extent, while the melted foam is hardening. Such an edge-pressing, after the roller pressing is readily arranged by providing pairs of longitudinally extending pressing bars above and below each heat sealed side edge of the joined wrapping laminates, and actuating those bars as the packaging undergoes intermittent transverse heat sealings, during those transverse heat sealing pauses. The longitudinal pressing bars are preferably long enough to span the length of wrapper advanced between pressing steps, but need not press the locations that are pressed during the transverse heat sealings.

FIG. 2 shows a feed arrangement for the lower wrapping laminate 31. A pair of Z-section side guides 151 and 152 are positioned on table 35 to guide laminate 31 to the lower melting shoes 38 and 39. For this purpose the central web 155 of each Z is vertically oriented, the lower webs 157 horizontally directed toward each other, and the upper webs 159 horizontally directed away from each other. Sets of mounting blocks 161 are secured to the outsides of the central webs and have downwardly directed mounting screws 163 which pass down through positioning slots 165 and are locked in position by nuts threaded on their lower ends. Four such mounting arrangements are preferably provided, two for each side guide.

To help assure that the side edges of wrapping laminate 31 are not curled away from the side guides as they approach the melting shoes, holddown bars 171 and 172 can be secured to the inner surfaces of the vertical webs of the side guides and fitted a short distance above their lower webs.

Also shown in FIG. 2 is a loading locator 175 adjustably fitted to the upper webs 159 of the side guides. This locator has a transversely extending rod 176 which adjustably carries a rear stop 177 and a side stop 178. These stops extend downwardly toward and end just above the foam face of laminate 31, and are used to help rapidly and accurately locate the position in which is to be placed an article to be wrapped and heat sealed, while the wrappers pause in a step-wise heat sealing operation. The loading position is determined to be intermediate the locations of the transverse heat seals, and those positions vary as the articles to be wrapped vary in length in the machine direction. Thus, for a series of articles to be packaged, the loading locator 175 is adjusted to the proper location along the side guides, the apparatus then set in operation, and a fresh article placed against the loading stops every time the wrapping laminates pause during a transverse heat sealing step.

The upper wrapping laminate 32 is shown as guided toward the upper melting shoes by a pair of offset rollers 181 and 182 that receive the laminate from an overhead spool. Further guiding can also be provided as for the lower laminate, but generally it is sufficient to hold the overhead spool accurately aligned, and with spool heads that keep the laminate from sidewise shifting on the spool.

Because the wrapping laminates can be as much as ¼ inch thick, they can be spooled up to a diameter of three feet or more, even on a small spool hub. Where such a spool is so positioned that there is only a small angular difference in take-off locations when the spool is full and empty, only a single feed roller 181 or 182 is needed. A similar dual or single feed roller arrangement can be provided for the lower laminate 31.

It is also helpful to apply a little friction to the laminate supply spools, to keep them from prematurely unwinding.

The heat sealing of the present invention can also be carried out with a single wrapping laminate that is folded along its longitudinal axis and fed through a load station and then to melting shoes which melt the foam edge at both folds but on only one side edge of the desired package. Alternatively, two wrapping laminates can be used as in FIGS. 1 and 2 with both laminates wide enough to receive two spaced rows of articles, with an extra longitudinal heat sealing between the rows.

The heat sealing equipment of the present invention can also be used for packaging a sealing articles with wrappers that have not been antistat treated, or are coated with cold sealing adhesive such as cohesive-nonadhesive latex layers as described in U.S. Pat. No. 4,086,384. For such cold sealing the melting shoes are kept retracted so that they do not engage the wrapping sheets. However, it is desirable to effect the transverse cutting and sealing with some heat applied to the transverse cutter blade. This reduces the build-up of foam resin on the cutter blade when "cold" sealing.

Such cold sealing and packaging can also be effected with wrapping sheets that have no foam, and are merely cohesive-nonadhesively coated paper or metal foil or unfoamed plastic or metallized paper or plastic, or combinations of these materials.

Where heat is used for fusing foam being sealed to another layer of foam or to a layer of paper, metal foil or plastic film, the heat can also be supplied by ultrasonic vibration, as in U.S. Pat. Nos. 3,580,793, 3,874,963, 4,026,000, 4,169,751, 4,373,979 and 4,490,199. Thus, the side edge seals as well as the transverse seals can be made by appropriately fitted ultrasonically driven welding horns and anvil bars.

Obviously, many modifications and variations of the present invention are possible in the light of the above teachings. It is, therefore, to be understood that within the scope of the appended claims the invention may be practiced otherwise than as specifically described.

I claim:

1. In the process of packaging articles between two elongated wrapping laminates each having a layer of antistat foam laminated to a backing web and the foam layer of one laminate is heat sealed to the foam layer of the other laminate while the elongated laminates are advanced by side edge rollers through a heat sealing zone as articles to be heat sealed are sandwiched between them, the improvement according to which the laminates are prepared for the heat sealing by melting the foam at the side edges of both laminates at their heat sealing sites, and the laminates with the melted foam edges are pressed together to heat seal them together after an article is sandwiched between them.

2. The combination of claim 1 in which the melting is effected by applying hot melting shoes directly to the foam at the sealing sites.

3. The combination of claim 1 in which transverse heat sealings are applied to the sandwiched assembly between successive articles, by transverse heat sealing bars.

4. The combination of claim 3 in which the advancing of the laminates is step-wise, with the transverse heat sealings effected between advancing steps.

5. The combination of claim 1 in which the foam is a hydrophibic foam coated with a very thin layer of liquid antistat agent.

6. The combination of claim 1 in which the foam layers are laminated to their backing layers with a pressure-sensitive adhesive.

7. The combination of claim 4 in which the foam is a hydrophobic foam coated with a very thin layer of liquid antistat agent, and each transverse heat sealing is effected in a time of over two seconds.

8. The combination of claim 6 in which the foam layers are adhered to metal layers and the metal layers adhered to support layers.

* * * * *